US008186653B2

(12) United States Patent
Tsuji

(10) Patent No.: US 8,186,653 B2
(45) Date of Patent: May 29, 2012

(54) FINE BUBBLE GENERATING APPARATUS

(76) Inventor: Hideyasu Tsuji, Hiroshima (JP)

( * ) Notice: Subject to any disclaimer, the term of this patent is extended or adjusted under 35 U.S.C. 154(b) by 652 days.

(21) Appl. No.: 12/227,524

(22) PCT Filed: May 21, 2007

(86) PCT No.: PCT/JP2007/060354
§ 371 (c)(1),
(2), (4) Date: Jan. 7, 2009

(87) PCT Pub. No.: WO2007/136030
PCT Pub. Date: Nov. 29, 2007

(65) Prior Publication Data
US 2009/0117241 A1 May 7, 2009

(30) Foreign Application Priority Data

| May 23, 2006 | (JP) | 2006-169310 |
| Sep. 14, 2006 | (JP) | 2006-280701 |
| Apr. 6, 2007 | (JP) | 2007-100841 |

(51) Int. Cl.
*B01F 3/04* (2006.01)
(52) U.S. Cl. ............................... 261/79.2; 261/92
(58) Field of Classification Search .................. 261/28, 261/79.2, 90, 92
See application file for complete search history.

(56) References Cited

U.S. PATENT DOCUMENTS

| 3,171,600 A * | 3/1965 | Eckey | 239/220 |
| 4,399,027 A * | 8/1983 | Miller | 209/164 |
| 6,382,601 B1 * | 5/2002 | Ohnari | 261/79.2 |
| 6,742,774 B2 * | 6/2004 | Holl | 261/83 |

(Continued)

FOREIGN PATENT DOCUMENTS

JP 08-196882 8/1996
(Continued)

OTHER PUBLICATIONS

International Search Report issued Jun. 12, 2007 for International (PCT) Application No. PCT/JP2007/060354.

(Continued)

*Primary Examiner* — Charles Bushey
(74) *Attorney, Agent, or Firm* — Wenderoth, Lind & Ponack, L.L.P.

(57) ABSTRACT

This invention provides a fine bubble generating apparatus which can efficiently generate fine bubbles on the nanometer level. This apparatus includes a cylindrical member having a cylindrical inner peripheral surface, a first end wall member configured to close one end of the cylindrical member, and a second end wall member configured to close the other end of the cylindrical member. The cylindrical member and the first and second end wall members define a fluid swirling chamber. The cylindrical member has a fluid inlet hole at a position close to the second end wall member to supply a gas-liquid mixed fluid in the tangential direction of the peripheral surface of the fluid swirling chamber. The second end wall member has a fluid outlet hole extending therethrough along the center axis of the inner peripheral surface of the fluid swirling chamber. The gas-liquid mixed fluid is introduced into the fluid swirling chamber at a position close to the second end wall member. Most of the fluid is directed toward the first end wall member while swirling along the inner peripheral surface of the fluid swirling chamber, reversed from the first end wall member toward the second end wall member and discharged through the fluid outlet hole.

8 Claims, 2 Drawing Sheets

U.S. PATENT DOCUMENTS

| | | | |
|---|---|---|---|
| 7,261,283 B1* | 8/2007 | Ohnari | 261/79.2 |
| 7,832,028 B2* | 11/2010 | Yayama et al. | 4/541.4 |
| 2005/0172446 A1* | 8/2005 | Fujisato | 15/322 |
| 2006/0054205 A1 | 3/2006 | Yabe et al. | |
| 2006/0065987 A1* | 3/2006 | Schletz | 261/76 |

FOREIGN PATENT DOCUMENTS

| | | |
|---|---|---|
| JP | 2000-189077 | 7/2000 |
| JP | 2001-276589 | 10/2001 |
| JP | 2002-011335 | 1/2002 |
| JP | 2002-143885 | 5/2002 |
| JP | 2002-166151 | 6/2002 |
| JP | 2002-273183 | 9/2002 |
| JP | 2003-117368 | 4/2003 |
| JP | 2004-121962 | 4/2004 |
| JP | 3682286 | 5/2005 |
| JP | 2005-144320 | 6/2005 |
| JP | 2005-169269 | 6/2005 |

OTHER PUBLICATIONS

Korean Office Action issued Jan. 18, 2011 in Application No. 2008-7030838.

* cited by examiner

FINE BUBBLE GENERATING APPARATUS

This application is a national stage filing under 35 U.S.C. of PCT/JP2007/060354, filed May 21, 2007, and claims foreign priority to JP 2006-169310, filed May 23, 2006, JP 2006-280701, filed Sep. 14, 2006, and JP 2007-100841, filed Apr. 6, 2007.

TECHNICAL FIELD

The present invention relates to apparatus for generating fine bubbles and, more particularly, to a fine bubble generating apparatus that can generate a large amount of nanobubbles having a diameter of nanometer level.

BACKGROUND ART

Recently, attention has been paid to various methods of utilizing fine bubbles having a diameter of micrometer level or nanometer level, and various apparatus for generating fine bubbles have been proposed. The present invention relates to an apparatus having a cylindrical interior space, wherein a gas-containing liquid is introduced into the interior space to generate a swirling flow to break up the gas into fine bubbles by the shear force of the swirling flow.

An apparatus of the type described above is disclosed, for example, in Japanese Patent Application Publication No. 2001-276589. The apparatus disclosed in this publication has a cylindrical swirling flow generating member immersed vertically in a liquid in a liquid storage tank for generating fine bubbles. The swirling flow generating member has one inlet hole provided in an upper end portion thereof to introduce a gas-liquid mixed fluid. The inlet hole tangentially intersects the inner peripheral surface of the cylindrical member. A funnel-shaped portion is provided at the lower end of the swirling flow generating member. The funnel-shaped portion has a fluid outlet at the lower end thereof. A pipe is connected to the inlet hole to supply a pressurized fluid from a pump. An aspirator is connected to an intermediate portion of the pipe. A liquid mixed with air as bubbles is passed through the aspirator and introduced into the swirling flow generating member through the inlet hole. The introduced gas-liquid mixed fluid moves downward while swirling in the swirling flow generating member and is discharged into the liquid storage tank through the fluid outlet at the lower end of the swirling flow generating member. A shear force occurs between the discharged gas-liquid mixed fluid and the liquid in the storage tank. Thus, the bubbles in the gas-liquid mixed fluid are broken up into fine bubbles.

Japanese Patent Application Publication No. 2003-117368 discloses a fine bubble generating apparatus including a cylindrical member having an inner peripheral surface formed into a cylindrical shape or the like. In this apparatus, a liquid, together with air, is introduced into a pump for liquid supply to form a gas-liquid mixed fluid containing bubbles in the pump, and the gas-liquid mixed fluid is introduced into the cylindrical member through one inlet hole provided in the cylindrical member close to one end thereof. The introduced gas-liquid mixed fluid moves axially toward the other end of the cylindrical member while swirling and is discharged through an outlet provided at the other end of the cylindrical member. Thus, the bubbles in the gas-liquid mixed fluid are broken up into fine bubbles. This publication also discloses an apparatus wherein a gas-liquid mixed fluid is introduced into a cylindrical member through an inlet hole provided in an axially central portion thereof, and the introduced gas-liquid mixed fluid moves toward both ends of the cylindrical member while swirling and is discharged through outlets provided at both ends of the cylindrical member.

Japanese Patent No. 3682286 discloses a bubble breaking-up apparatus including a swirling flow generating member with an oval or elliptical inner peripheral surface that is immersed in a liquid in a liquid storage tank. In this apparatus, the swirling flow generating member has one inlet hole for introducing a gas-liquid mixed fluid at the center of the major axis of ellipse. The gas-liquid mixed fluid introduced through the inlet hole moves in a swirling flow toward outlets provided at both ends in the major axis direction of the swirling flow generating member and is discharged through the outlets. It is stated that the gas in the gas-liquid mixed fluid is broken up into fine bubbles by swirling flow in the swirling flow generating member and shear force applied to the gas-liquid mixed fluid when discharged.

Japanese Patent Application Publication Nos. 2002-11335 and 2002-166151 disclose an apparatus wherein a gas-liquid mixed fluid is introduced into a swirling flow generating member having a cylindrical inner peripheral surface through two axially spaced gas-liquid mixture inlet holes provided in the swirling flow generating member, and the introduced gas-liquid mixed fluid is discharged through outlets provided at both ends of the swirling flow generating member.

Patent Document 1: Japanese Patent Application Publication No. 2001-276589
Patent Document 2: Japanese Patent Application Publication No. 2003-117368
Patent Document 3: Japanese Patent No. 3682286
Patent Document 4: Japanese Patent Application Publication No. 2002-11335
Patent Document 5: Japanese Patent Application Publication No. 2002-166151

DISCLOSURE OF THE INVENTION

Problem to be Solved by the Invention

All the above-described fine bubble generating apparatus break up bubbles contained in a gas-liquid mixed fluid into fine bubbles by generating a swirling flow in the fluid. None of them, however, can efficiently generate nanometer-level bubbles (nanobubbles).

An object of the present invention is to provide a fine bubble generating apparatus that can efficiently generate nanobubbles.

Means for Solving the Problem

The present invention provides a fine bubble generating apparatus including a gas swirling shearing unit. The gas swirling shearing unit includes a cylindrical member having a cylindrical inner peripheral surface, a first end wall member configured to close one end of the cylindrical member, a second end wall member configured to close the other end of the cylindrical member, a fluid swirling chamber defined by the cylindrical member and the first and second end wall members, one fluid inlet hole extending through the wall of the cylindrical member at a position closer to the second end wall member than the center in the axial direction of the cylindrical member to introduce a gas-liquid mixed fluid into the fluid swirling chamber in a tangential direction thereof, and a fluid outlet hole extending through the second end wall member along the center axis of the inner peripheral surface of the cylindrical member.

The feature of this fine bubble generating apparatus resides in that the fluid inlet hole is provided at a position closer to the second end wall member than the center in the axial direction of the cylindrical member. With this arrangement, unlike in the aforementioned fine bubble generating apparatus having one fluid inlet hole, most of the gas-liquid mixed fluid introduced into the fluid swirling chamber through the fluid inlet hole moves in a swirling flow toward the first end wall member, which has no outlet hole, and is reversed by the first end wall member while being directed toward the radial center of the fluid swirling chamber. Thereafter, while further increasing the swirling velocity, the fluid moves toward the second end wall member and is discharged to the outside through the fluid outlet hole.

That is, in the foregoing conventional apparatus, the gas-liquid mixed fluid introduced into the fluid swirling chamber simply moves toward the outlet hole. In this fine bubble generating apparatus, unlike in the conventional apparatus, most of the gas-liquid mixed fluid introduced into the fluid swirling chamber once moves in a swirling flow in a direction away from the outlet hole. The swirling flow is reversed by the first end wall member to move therefrom toward the second end wall member. At this time, the radius of rotation of the swirling flow moving toward the second end wall member is smaller than that of the swirling flow moving toward the first end wall member. Therefore, the flow velocity increases, and the shear force acting on the gas contained in the liquid increases. Thus, breaking up of the gas is accelerated.

Specifically, the fluid inlet hole may be configured to be close to the second end wall member. More specifically, the fluid inlet hole may have a circular sectional shape and may be positioned away from the second end wall member in the axial direction by a distance at least 0.5 to 2 times the diameter of the fluid inlet hole.

The reason why the fluid inlet hole is not positioned in contact with the second end wall member is to prevent the swirling velocity of the gas-liquid mixed fluid introduced through the fluid inlet hole from being reduced by frictional resistance that would otherwise be offered by the second end wall member.

Preferably, the fluid swirling chamber has an axial length not less than 6 times the diameter of the fluid inlet hole. The reason for this is to lengthen, as much as possible, the path of swirling flow moving toward the first end wall member and the path of swirling flow moving from the first end wall member toward the second end wall member.

Further, it is preferable that the fluid inlet hole be configured to extend at an angle of from 10° to 30°, more preferably about from 15° to 20°, to a direction in which the fluid inlet hole would extend if it is assumed to internally touch the inner wall surface of the fluid swirling chamber and extend tangentially, about the point of internal tangency to the inner wall surface of the fluid swirling chamber. The numerical values of the angle were obtained from a gas swirling shearing unit actually made on an experimental basis. It was possible with this gas swirling shearing unit to generate nanobubbles more efficiently than in the case of setting the fluid inlet hole to extend in the true tangential direction.

The inner peripheral surface of the cylindrical member may be mirror-finished, and a portion of the inner peripheral surface of the cylindrical member that circumferentially corresponds to the fluid inlet hole, which opens on the inner peripheral surface, may be provided with a plurality of annular grooves spaced from each other in the axial direction of the inner peripheral surface. The annular grooves have a width and a depth that are not more than 1 millimeter.

With the above-described structure, it is possible to form the gas-liquid mixed fluid introduced into the fluid swirling chamber into a swirling flow while keeping it from expanding much in the axial direction.

The cylindrical member and the first and second end wall members have a natural frequency different from a frequency generated by the fluid introduced into the fluid swirling chamber through the fluid inlet hole. The reason for this is to prevent the vibration of the cylindrical member from increasing, which would otherwise hinder smooth generation of swirling flow.

More specifically, the fine bubble generating apparatus may further include a vortex pump connected to the fluid inlet hole of the gas swirling shearing unit to supply a fluid to the fluid swirling chamber. The vortex pump has a casing, an impeller rotating in the casing, a liquid inlet formed in the peripheral wall of the casing, a gas inlet formed in the peripheral wall of the casing, and a fluid outlet provided in the peripheral wall of the casing to deliver a gas-liquid mixed fluid formed from a liquid and gas sucked into the casing and mixed together by rotation of the impeller. The fluid outlet of the vortex pump is connected to the fluid inlet hole of the gas swirling shearing unit. The use of such a vortex pump enables the gas to be broken up into fine bubbles before being introduced into the gas swirling shearing unit and hence allows nanobubbles to be generated even more efficiently.

Preferably, a disperser is connected to the fluid outlet hole of the gas swirling shearing unit to dispersedly discharge the fluid delivered from the gas swirling shearing unit. Specifically, the disperser may have a cylindrical member having a cylindrical inner peripheral surface, end wall members configured to close both ends of the cylindrical member, a fluid inlet formed in an axially central portion of the cylindrical member in communication with the fluid outlet hole of the gas swirling shearing unit, and fluid outlets extending through the end wall members, respectively, along the axis of the cylindrical member.

BEST MODE FOR CARRYING OUT THE INVENTION

An embodiment of the fine bubble generating apparatus according to the present invention will be explained below with reference to the accompanying drawings.

Figure 1:
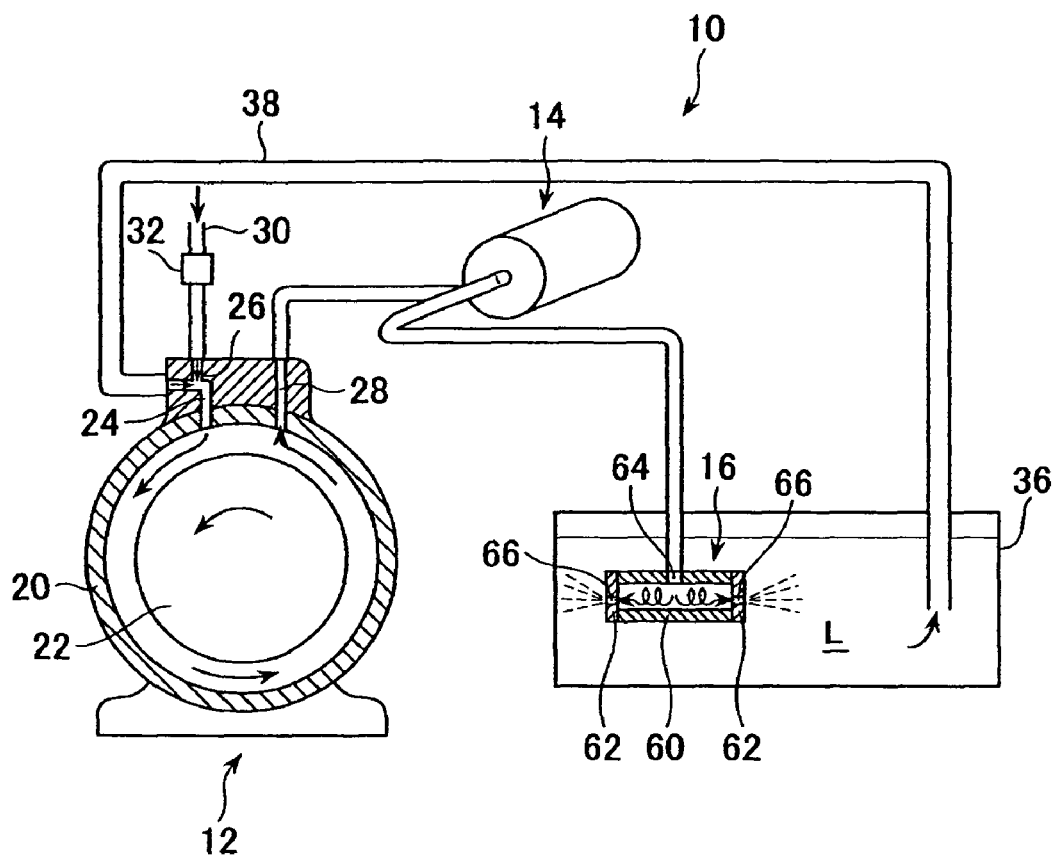
FIG. 1 is a diagram for explaining a fine bubble generating apparatus according to the present invention.

FIG. 1 is an explanatory view of a fine bubble generating apparatus 10 according to the present invention. The apparatus 10 has a vortex pump 12, a gas swirling shearing unit 14, and a disperser 16. The pump 12 forms a gas-liquid mixed fluid. The gas swirling shearing unit 14 receives the gas-liquid mixed fluid formed in the vortex pump 12 and breaks up a gas contained in the gas-liquid mixed fluid into fine bubbles. The disperser 16 dispersedly discharges the fluid in which the gas has been broken up into fine bubbles by the gas swirling shearing unit 14. The disperser 16 is immersed in a liquid L in a liquid storage tank 36 to dispersedly discharge fine bubbles into the liquid L in the liquid storage tank 36. The liquid L in the liquid storage tank 36 is supplied to the pump 12 through a pipe 38.

The vortex pump 12 has a housing 20 and an impeller 22 housed in the housing 20 and driven to rotate. The housing 20 is provided with a liquid suction hole 24, a gas suction hole 26 and a delivery hole 28. The liquid suction hole 24 is connected with the pipe 38 to suck the liquid in the liquid storage tank 36 into the pipe 38. The gas suction hole 26 is communicated with the liquid suction hole 24 so that a gas is sucked into the liquid flowing through the liquid suction hole 24. The delivery hole 28 delivers a gas-liquid mixed fluid formed from the liquid and gas sucked into the housing 20 and mixed together by rotation of the impeller 22. The delivery hole 28 has a smaller diameter than that of the liquid suction hole 24 to increase the speed of the fluid delivered to the gas swirling shearing unit 14.

The gas suction hole 26 is connected with a pipe 30 that is provided with a solenoid valve 32. The solenoid valve 32 is closed when the pump 12 is started. The solenoid valve 32 is opened when a predetermined time (e.g. 60 seconds) has elapsed after the start of the pump 12. This is done to minimize the occurrence of cavitation in the pump 12 due to suction of gas into the pump 12.

Figure 2:
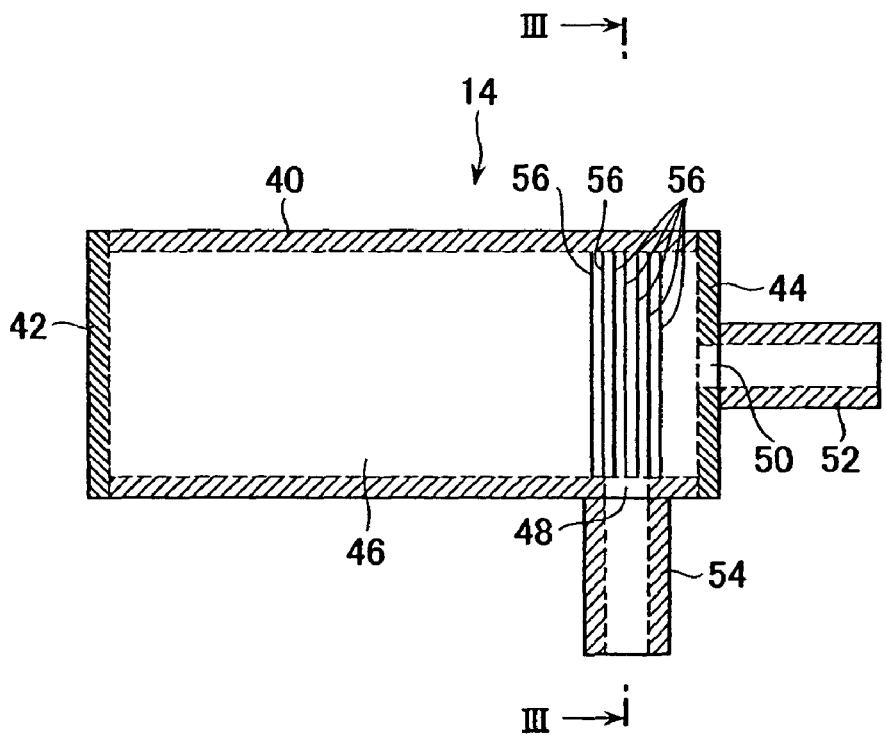
FIG. 2 is a diagram for explaining the interior of a gas swirling shearing unit used in the fine bubble generating apparatus.
Figure 3:
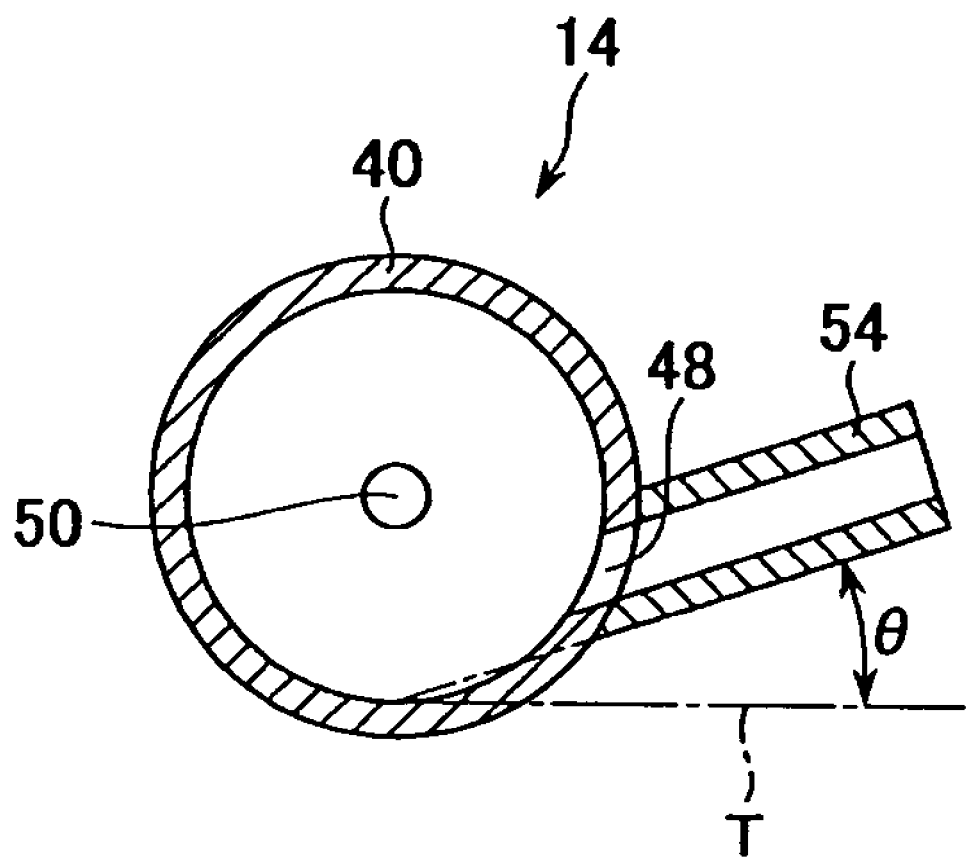
FIG. 3 is a sectional view taken along the line III-III in FIG. 2.

The gas swirling shearing unit 14 has, as shown in FIGS. 2 and 3, a cylindrical member 40 having a cylindrical inner peripheral surface, a first end wall member 42 configured to close one end of the cylindrical member 40, a second end wall member 44 configured to close the other end of the cylindrical member 40, a fluid swirling chamber 46 defined by the cylindrical member 40 and the first and second end wall members 42 and 44, a fluid inlet hole 48 extending through the wall of the cylindrical member 40 at a position closer to the second end wall member 44 than the center in the axial direction of the cylindrical member 40 to introduce the gas-liquid mixed fluid into the fluid swirling chamber 46 in a tangential direction thereof, and a fluid outlet hole 50 extending through the second end wall member 44 along the center axis of the inner peripheral surface of the cylindrical member 40.

In the illustrated example, a connecting pipe 54 is secured to the outer peripheral surface of the cylindrical member 40 in communication with the fluid inlet hole 48. The pipe 54 is connected to a pipe 55 extending from the delivery hole 28 of the pump 12. A connecting pipe 52 is secured to the second end wall member 44 in communication with the fluid outlet hole 50. The pipe 52 is connected to a pipe extending to the disperser 16.

In the illustrated example, the fluid inlet hole 48 is configured to be close to the second end wall member 44. Specifically, the fluid inlet hole 48 has a circular sectional shape and is positioned away from the second end wall member 44 by a distance substantially equal to the diameter of the fluid inlet hole 48.

The fluid swirling chamber 46 has an axial length not less than 5 times the diameter of the fluid inlet hole 48 and a diameter not less than 4 times the diameter of the fluid inlet hole 48. In the illustrated example, the axial length of the fluid swirling chamber 46 is about 12 times the diameter of the fluid inlet hole 48, and the diameter of the former is about 5 times the diameter of the latter.

The fluid inlet hole 48 and the connecting pipe 54 communicated therewith has an axis intersecting with a hypothetical axis T of the fluid inlet hole 48, that is assumed to intersect with an inner wall surface of the fluid swirling chamber 46 and extend tangentially, at a point I where the hypothetical axis touches the inner wall surface at an angle of from 10 to 30 degrees, preferably about from 15° to 20°.

The inner peripheral surface of the cylindrical member 40 is mirror-finished, and a portion of the inner peripheral surface that circumferentially corresponds to the fluid inlet hole 48, which opens on the inner peripheral surface, is provided with a plurality of annular grooves 56 spaced from each other in the axial direction of the inner peripheral surface. The annular grooves 56 have a width and a depth that are not more than 1 millimeter. In the illustrated example, an inner peripheral surface portion that circumferentially corresponds to the fluid inlet hole 48 is provided with five grooves, and one additional groove is provided at each side of the inner peripheral surface portion provided with the five grooves. Specific dimensions of the annular grooves 56 are 0.3 mm in depth and 0.5 mm in width.

The cylindrical member 40 and the first and second end wall members 42 and 44 are designed to have mass and so forth that have a natural frequency different from a frequency generated by the fluid introduced into the fluid swirling chamber 46 through the fluid inlet hole 48.

The disperser 16 has a cylindrical member 60 with a cylindrical inner peripheral surface and end wall members 62 configured to close both ends of the cylindrical member 60. The disperser 16 further has a fluid inlet 64 formed in an axially central portion of the cylindrical member 60 in communication with the fluid outlet hole 50 of the gas swirling shearing unit 14. Further, the disperser 16 has fluid outlets 66 extending through the end wall members 62, respectively, along the axis of the cylindrical member 60.

The fluid delivered from the fluid outlet hole 50 of the gas swirling shearing unit 14 flows into the disperser 16 through the fluid inlet 64 of the disperser 16, separates into two streams flowing toward the axially opposite ends of the disperser 16 while swirling and is dispersedly discharged into the liquid in the liquid storage tank 36 from the fluid outlets 66.

To operate the fine bubble generating apparatus 10, the pump 12 is driven to suck in the liquid from the liquid storage tank 36, thereby inducing a flow of liquid circulating from the pump 12 through the gas swirling shearing unit 14 and the disperser 16 to the liquid storage tank 36.

The solenoid valve 32 is opened when a predetermined time, e.g. 60 seconds, has elapsed after the start of the pump 12. Consequently, air is sucked in through the pipe 30, and thus a gas-liquid mixed fluid is introduced into the housing 20 of the pump 12. The gas-liquid mixed fluid introduced into the pump housing 20 is driven to move along the inner peripheral surface of the housing 20 by the action of the impeller 22 and delivered through the delivery hole 28. Meanwhile, the gas in the fluid is broken up into fine bubbles by shear force from turbulent flow occurring in the fluid. Some bubbles obtained at this stage may have a diameter of micrometer level.

The gas-liquid mixed fluid from the delivery hole 28 is introduced into the fluid swirling chamber 46 of the gas swirling shearing unit 14, where the fluid is formed into a swirling flow as stated above. Thus, the gas in the fluid is further broken up into fine bubbles by the strong shear force of the swirling flow. The strong shear force in the gas swirling shearing unit 14 enables most bubbles to break up into fine bubbles on the nanometer level.

The gas-liquid mixed fluid delivered from the gas swirling shearing unit 14 is discharged into the liquid storage tank 36 while being formed into a swirling flow again by the disperser 16. Accordingly, breaking up of bubbles also takes place in the disperser 16.

In the illustrated example, the liquid is circulated from the liquid storage tank 36 through the pump 12, the gas swirling shearing unit 14 and the disperser 16. In this regard, the supply of the liquid to the pump 12 may be performed from other than the liquid storage tank 36. However, if the liquid is circulated as in the illustrated example, breaking up of the gas is performed repeatedly, and it is therefore possible to obtain even finer bubbles.

As a specific example, the cylindrical member 40 and the end wall members 42 and 44 of the gas swirling shearing unit 14 were formed from stainless steel having a thickness of 10 mm. The fluid swirling chamber 46 was formed with an axial length of 110 mm and an inner diameter of 43 mm to 55 mm. The fluid inlet hole 48 and the connecting pipe 54 each had an inner diameter of 10 mm. The distance from the second end wall member 44 to the center line of the fluid inlet hole 48 was 20 mm. The mounting angle θ of the connecting pipe 54 was about 18 degrees. The delivery from the pump 12 was 120 liters per minute. In this case, generation of a large number of fine bubbles on the nanometer level was confirmed.

In the foregoing, one embodiment of the fine bubble generating apparatus according to the present invention has been described. It should be noted that the fine bubble generating apparatus is usable in various applications as follows.

For example, water containing nanobubbles (hereinafter referred to as "nanobubble water") generated by the fine bubble generating apparatus according to the present invention is superior in surface activity and wettability and usable for fibers, metallic molds, machine parts, silicon wafers and various other purposes. For washing silicon wafers, nanobubble water containing nitrogen bubbles should preferably be used. To mine extra-heavy oil out from underground, it is general practice to inject water containing a surface-active agent into an extra-heavy oil deposit located deep under the ground and to suck up extra-heavy oil mixed with the water. In this regard, if nanobubble water is used, it is possible to reduce the amount of surface-active agent used. It is also possible to reduce to a considerable extent the work needed to separate the obtained extra-heavy oil from the surface-active agent.

In addition, nanobubble water has a high penetrability and is therefore usable in alcohol brewing, for example. That is, to brew rice wine (sake), for example, polished rice is dipped in water for about 24 hours before being steamed. In this case, if rice is dipped in nanobubble water, the dipping time can be reduced to about 6 hours, i.e. one fourth of the conventional dipping time.

In making bread or fish paste products, if wheat flour or fish is kneaded with nanobubble water prepared by using nitrogen, aerobic bacteria in the wheat flour or fish die. Therefore, it becomes possible to prevent decomposition of the bread or fish paste products without using a preservative.

Nanobubble water can also be used to purify river water, etc. If nanobubble water is used in a wastewater treatment system employing the activated sludge process, in particular, activated sludge, i.e. bacteria, can be activated, and the purification efficiency can be increased.

Further, if oxygen or air nanobubbles are generated in petroleum or other combustion oil by the fine bubble generating apparatus according to the present invention, the combustion efficiency of the oil can be improved to a considerable extent.

Further, nanobubbles offer physiological activity. For example, if hands are immersed in nanobubble water, the pores of the hands open, and sebum in the pores can be removed. If nanobubble water is used for a hot bath, the hot bath effect can be enhanced.

If nanobubbles in nanobubble water are destroyed by ultrasonic waves or light energy, explosive power can be generated in microscopic areas. Through this technique, nanobubble water can be used to cut genes in genetic recombination, for example.

The invention claimed is:

1. A fine bubble generating apparatus comprising a gas swirling shearing unit, the gas swirling shearing unit including:
   a cylindrical member having a cylindrical inner peripheral surface;
   a first end wall member configured to close one end of the cylindrical member;
   a second end wall member configured to close the other end of the cylindrical member;
   a fluid swirling chamber defined by the cylindrical member, the first end wall member and the second end wall member;
   a fluid inlet hole extending through a wall of the cylindrical member at a position closer to the second end wall member than a center in an axial direction of the cylindrical member to introduce a gas-liquid mixed fluid into the fluid swirling chamber in a tangential direction thereof; and
   a fluid outlet hole extending through the second end wall member along a center axis of the inner peripheral surface of the cylindrical member;
   wherein the fluid inlet hole has an axis intersecting with a hypothetical axis of the fluid inlet hole, that is assumed to intersect with an inner wall surface of the fluid swirling chamber and extend tangentially, at a point where the hypothetical axis touches the inner wall surface at an angle of from 10 to 30 degrees; and
   wherein the inner peripheral surface of the cylindrical member is mirror-finished, and a portion of the inner peripheral surface of the cylindrical member that circumferentially corresponds to the fluid inlet hole, which opens on the inner peripheral surface, is provided with a plurality of annular grooves spaced from each other in an axial direction of the inner peripheral surface, the annular grooves having a width and a depth that are not more than 1 millimeter.

2. The fine bubble generating apparatus of claim 1, wherein the fluid inlet hole is set close to the second end wall member.

3. The fine bubble generating apparatus of claim 2, wherein the fluid inlet hole has a circular sectional shape and is positioned away from the second end wall member in the axial direction by a distance at least 0.5 to 2 times a diameter of the fluid inlet hole.

4. The fine bubble generating apparatus of claim 3, wherein the fluid swirling chamber has an axial length not less than 6 times the diameter of the fluid inlet hole.

5. The fine bubble generating apparatus of claim 1, wherein the cylindrical member and the first end wall member and second end wall member have a natural frequency different from a frequency generated by the fluid introduced into the fluid swirling chamber through the fluid inlet hole.

6. A fine bubble generating apparatus comprising a gas swirling shearing unit, the gas swirling shearing unit including:
   a cylindrical member having a cylindrical inner peripheral surface;
   a first end wall member configured to close one end of the cylindrical member;
   a second end wall member configured to close the other end of the cylindrical member;
   a fluid swirling chamber defined by the cylindrical member, the first end wall member and the second end wall member;

a fluid inlet hole extending through a wall of the cylindrical member at a position closer to the second end wall member than a center in an axial direction of the cylindrical member to introduce a gas-liquid mixed fluid into the fluid swirling chamber in a tangential direction thereof; and a fluid outlet hole extending through the second end wall member along a center axis of the inner peripheral surface of the cylindrical member;

wherein the fine bubble generating apparatus further comprises a vortex pump connected to the fluid inlet hole of the gas swirling shearing unit to supply a fluid to the fluid swirling chamber, the vortex pump including:

a casing;

an impeller rotating in the casing;

a liquid inlet formed in a peripheral wall of the casing;

a gas inlet formed in the peripheral wall of the casing; and a fluid outlet provided in the peripheral wall of the casing to deliver a gas-liquid mixed fluid formed from a liquid and gas sucked into the casing and mixed together by rotation of the impeller, the fluid outlet being connected to the fluid inlet hole of the gas swirling shearing unit.

7. The fine bubble generating apparatus of claim 6, further comprising a disperser connected to the fluid outlet hole of the gas swirling shearing unit to dispersedly discharge the fluid delivered from the gas swirling shearing unit.

8. The fine bubble generating apparatus of claim 7, wherein the disperser includes:

a cylindrical member having a cylindrical inner peripheral surface;

end wall members configured to close both ends of the cylindrical member;

a fluid inlet formed in an axially central portion of the cylindrical member in communication with the fluid outlet hole of the gas swirling shearing unit ; and fluid outlets extending through the end wall members, respectively, along an axis of the cylindrical member.

\* \* \* \* \*